(12) United States Patent
Girardier et al.

(10) Patent No.: US 11,223,900 B2
(45) Date of Patent: Jan. 11, 2022

(54) BLUETOOTH DEVICE AND METHOD FOR CONTROLLING A PLURALITY OF WIRELESS AUDIO DEVICES WITH A BLUETOOTH DEVICE

(71) Applicant: Google LLC, Mountain View, CA (US)

(72) Inventors: Thomas Girardier, Bourg la Reine (FR); Julien Goupy, Le Mesnil-Saint-Denis (FR); Vincent Nallatamby, Paris (FR)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/756,866

(22) PCT Filed: Oct. 15, 2018

(86) PCT No.: PCT/EP2018/078022
§ 371 (c)(1),
(2) Date: Apr. 17, 2020

(87) PCT Pub. No.: WO2019/076792
PCT Pub. Date: Apr. 25, 2019

(65) Prior Publication Data
US 2021/0195330 A1 Jun. 24, 2021

(30) Foreign Application Priority Data
Oct. 20, 2017 (EP) ..................................... 17306442

(51) Int. Cl.
*H04R 3/12* (2006.01)
*G06F 16/245* (2019.01)

(52) U.S. Cl.
CPC .............. *H04R 3/12* (2013.01); *G06F 16/245* (2019.01); *H04R 2420/07* (2013.01); *H04R 2420/09* (2013.01)

(58) Field of Classification Search
None
See application file for complete search history.

(56) References Cited

U.S. PATENT DOCUMENTS 7,987,294 B2 * 7/2011 Bryce ................. H04L 12/2809
709/248
9,560,449 B2 * 1/2017 Carlsson .................. H04R 3/12
(Continued)

FOREIGN PATENT DOCUMENTS

WO WO2016/123467 8/2016

OTHER PUBLICATIONS

International Search Report—PCT/EP2018/078022—dated Nov. 6, 2018.

*Primary Examiner* — Paul W Huber
(74) *Attorney, Agent, or Firm* — Lerner, David, Littenberg, Krumholz & Mentlik, LLP

(57) ABSTRACT

The Bluetooth device (DEV) controlling a plurality of wireless audio devices, comprises: a wireless communication circuit, to receive a wireless audio device identifier from each wireless audio device; a sound processing circuit to apply independent audio effects on a main audio stream such that the sound processing circuit outputs as many modified audio streams as the wireless communication circuit has received identifiers of wireless audio devices, on the basis of the characteristics of each wireless audio device; an allocation circuit to allocate each modified audio stream to a respective wireless audio device, a transmission circuit to wirelessly transmit through a Bluetooth usage each modified audio stream to said respective wireless audio device for emission by the wireless audio devices.

20 Claims, 5 Drawing Sheets

(56) References Cited

U.S. PATENT DOCUMENTS

| | | | |
|---|---|---|---|
| 9,788,113 B2* | 10/2017 | Wilberding | H04S 1/007 |
| 10,095,470 B2* | 10/2018 | Lang | G10L 15/1822 |
| 2013/0024018 A1* | 1/2013 | Chang | G08C 17/02 |
| | | | 700/94 |
| 2013/0304458 A1 | 11/2013 | Shavit et al. | |
| 2016/0073197 A1* | 3/2016 | Hammer | H04R 5/02 |
| | | | 381/80 |
| 2016/0227319 A1* | 8/2016 | Zhao | H04R 27/00 |
| 2016/0353218 A1* | 12/2016 | Starobin | G06F 3/0488 |

* cited by examiner

BLUETOOTH DEVICE AND METHOD FOR CONTROLLING A PLURALITY OF WIRELESS AUDIO DEVICES WITH A BLUETOOTH DEVICE

BACKGROUND OF THE INVENTION

Field of the Invention

The description relates in particular to a device for controlling connected multimedia devices, in particular connected loudspeakers, also called wireless speakers.

Description of the Related Art

It is increasingly common to connect a source device (computer, tablet, mobile phone, etc.) containing multimedia content to a wireless speaker suitable for reproducing the sound of the multimedia content. It seems desirable to be able to connect a source device to multiple wireless speakers in order to obtain better sound (for example stereophonic sound or even 5.1 surround sound or other configurations). It is then desirable to synchronize these speakers so that there is no delay between the sounds played on two different speakers. A similar problem arises in the case of multimedia content other than audio, for example in the case of video projection. This may involve the transmission of several copies of the same stream, for example live transmission of a video of a conference on several screens located in the same room. It may also involve the transmission on multiple screens of videos corresponding to the same scene from different points of view (for example in a video game context), the videos then being different but needing to be perfectly synchronized.

When all the connected loudspeakers used are from the same manufacturer and are known to the source device, the manufacturer can control the entire chain and can set up the synchronization software. Each speaker can for example communicate data such as a pointer indicating the next part of a buffer memory to be read or the state of a clock internal to the source device, which can be arranged to draw the necessary conclusions by determining the relative values of the various internal clocks and the different read positions in the respective buffer memories of the various speakers. However, when a source device connects to wireless speakers that it does not know and especially when these speakers are heterogeneous (for example from different manufacturers), it is impossible to synchronize these speakers as their operation and characteristics are unknown.

A commonly used wireless protocol is the Bluetooth protocol. Bluetooth is a communication standard that is well known to the person skilled in the art, defined since 1994 and managed by a group of manufacturers (the Bluetooth SIG) which publishes the successive versions. The current version is version 4.2 and a version 5 has just been announced. Bluetooth allows two-way communication of data over short distances (known as a piconet which refers to a network covering a personal area). The range of Bluetooth devices is thus limited to a few tens of meters. Bluetooth uses radio waves that are in the UHF band (between 300 MHz and 3 GHz). Bluetooth aims to simplify connections between electronic devices by eliminating wired links Bluetooth thus allows replacing, with wireless communications, the cords between a master multimedia device (hi-fi system, radio, computer, tablet, mobile phone, etc.) and target multimedia devices such as speakers arranged to reproduce a multimedia stream received.

Bluetooth speakers have met with some success because of their high portability.

However, if an audio data exchange profile called the A2DP profile is used, the Bluetooth standard does not allow a Bluetooth chip to transmit multiple audio streams in parallel to multiple multimedia devices that one wishes to synchronize. This A2DP profile does not allow synchronized point-to-multipoint transmission. The Bluetooth standard in fact states that: "The following restrictions are applied to this profile: 1. This profile does not support a synchronized point-to-multipoint distribution." Thus, in theory it is not possible to design a device for synchronized control of Bluetooth multimedia devices with the synchronized control device comprising a single Bluetooth chip for controlling multiple multimedia devices, because Bluetooth does not allow it.

It has already been proposed to create a point-to-multipoint Bluetooth device for multiple speakers. For example, application FR2920930 filed on Sep. 6, 2007 and now permanently abandoned, proposed such a device. But this application did not describe how to implement such a device, which seems impossible under the Bluetooth standard if only one Bluetooth chip is used. The inadequate description of this application prevents drawing any relevant teachings as to how to create a point-to-multipoint link, and even more so a synchronized point-to-multipoint link.

Although Bluetooth does not provide for it, it would be possible to create in a Bluetooth chip a device to control several Source SEPs in order to control multiple Bluetooth devices (instead of providing as many Bluetooth chips in a control circuit as there are Bluetooth devices to be controlled). An SEP is a "Stream End Point". Bluetooth communications are point-to-point between two SEPs. An SEP represents the resources and capabilities of a device. For example, a device such as a mobile phone may have three SEPs, one representing its capabilities as a video receiver, another representing its capabilities as an audio receiver with an SBC codec, and a last one representing its capabilities as an audio receiver with an aptX codec. Each codec must be associated with a different SEP than the one(s) associated with other codec(s), but the same codec can be associated with multiple SEPs.

However, if the Bluetooth devices are Bluetooth multimedia devices, the problem arises of synchronizing the signals transmitted to each of these Bluetooth multimedia devices in A2DP.

The acronym A2DP stands for "Advanced Audio Distribution Profile." The conventional A2DP profile defines a set of protocols and procedures for the exchange of audio data via the Bluetooth protocol between a master device (known as the Source) and a slave device (known as the "Sink", designating the ultimate destination of a stream, for example a Bluetooth speaker). This A2DP profile is constructed using several layers defined by the Bluetooth standard.

The profile relies in particular on low-level layers that are well known to those skilled in the art. These layers comprise:
 a "Baseband" layer,
 an "LMP" layer (acronym for "Link Manager Protocol");
 an "L2CAP" layer (acronym for "Logical Link Control and Adaptation Protocol"),
 an SDP layer ("Service Discovery Protocol"). These layers are protocols defined in the Bluetooth standard.

The A2DP profile also relies on a high-level layer called the application layer. This is the layer in which the device determines the transport parameters and the various services available. It is also at this level that the choice of codec used to transmit the audio data is made (which may involve decoding followed by re-encoding when the audio stream to be transmitted is already encoded, which is usually the case).

Lastly, the A2DP profile relies on an AVDTP layer ("Audio/Video Distribution Transport Protocol") that defines the binary transactions between Bluetooth devices for setting up a stream and for streaming an audio and/or video stream using L2CAP. It therefore covers procedures for establishing the audio stream, negotiating the parameters of the audio stream, and transmitting the data of the audio stream. AVDTP comprises a signaling entity for negotiating streaming parameters and a transport entity for managing the stream itself. AVDTP defines a transport protocol for audio and/or video data. More specifically, AVDTP concerns the transport of audio and/or video data between two SEPs.

A limitation imposed by AVDTP according to the Bluetooth standard is that when a connection has been negotiated between two SEPs, these two SEPs must be locked to each other for streaming. By default, a connected SEP refuses any new connections. In recent Bluetooth products, a function known as "social mode" sometimes allows changing this default behavior. However, although this social mode function allows a new connection, it cuts off the current connection. For example, there can be two telephones connected to the same Bluetooth speaker, but multiple simultaneous transports cannot be set up. Switching to a new connection typically occurs by terminating the previous connection while keeping the previously connected telephone in memory. As a result, if there is only one audio source SEP on a Source device then only one AVDTP transport can be established to a given Sink device at a given time, according to the Bluetooth standard.

The L2CAP layer defines the most basic data exchange protocol of the Bluetooth specification. The L2CAP layer enables the segmentation and reassembly of packets, multiplexing, and quality of service. It is from this L2CAP layer that the various transport protocols (such as AVDTP) based on different Bluetooth profiles (such as A2DP) are implemented. An L2CAP channel is created between a CID ("Channel Identifier") of a master device and a CID of a slave device, allowing the exchange of data between these two devices. The L2CAP channels are each configured to manage the control of data streams passing through channels defined by L2CAP (L2CAP channels). For this purpose, different parameters can be taken into account independently for each L2CAP channel, in particular:

An FTO or "Flush Timeout" parameter defines an expiration period for a data packet in a buffer memory of a master device. This period is infinite by default (blocked mode), which means that a transmitted packet that does not reach its destination is resent until a packet (the initial packet or the resent packets) has reached the destination. However, the period can also be such that retransmission never occurs (if the "Flush Timeout" parameter is set to an appropriate value defined by the Bluetooth standard), which amounts to a zero period. The period can also have a finite value. There exists a Boolean variable called "flag non-automatically flushable" in Bluetooth packets, which allows indicating that the packet concerned cannot be deleted automatically.

A QoS parameter (acronym for "Quality of Service") which enables defining the maximum latency between inclusion of a packet to be transmitted in an L2CAP channel and its actual transmission.

Parameters called "Extended Flow Features", replacing and supplementing the combination of the "Flush Timeout" and "QoS" parameters mentioned above.

These settings are negotiated between the Bluetooth stack of a master Bluetooth device and the Bluetooth stack of a slave Bluetooth device, and apart from the default values are not always supported.

L2CAP enables the implementation of different modes. These modes are also parameters of the L2CAP channels, in the same manner as the "Extended Flow features" parameters or the "Flush Timeout" parameter. It is the set of all these parameters (including modes) that enables modifying the control of streams. Each mode defines different procedures for managing data streams. Within the conventional Bluetooth framework (called BR/EDR), five operating modes are possible for an L2CAP channel. These modes are:

"Basic Mode" (basic L2CAP mode),
"Flow Control Mode",
"Retransmission Mode",
"Enhanced Retransmission Mode" (known as "ERTM"), and
"Streaming Mode" (known as "SM").

"Basic Mode" is the default mode and is supported by all Bluetooth stacks. It does not require any configuration. "Flow Control Mode" sends packets but never retransmits lost packets. However, these packets (called PDUs) are detected when they are lost, and "Flow Control Mode" allows the communication of a report listing the lost packets. "Flow Control Mode" and "Retransmission Mode" can only be used if "ERTM" and "SM" are not usable. These two modes ("Flow Control Mode" and "Retransmission Mode") are now almost never used. "ERTM" makes it possible to take into account a given maximum number of retransmissions and a given maximum duration during which a retransmission can take place, and makes it possible to identify the packets that are lost or corrupted. "SM" is adapted for asynchronous data flows. It takes into account a finite "Flush Timeout" parameter. On the Bluetooth receiver side, if the buffer memory is full the previous data are overwritten.

In the Bluetooth standard, a parameter called "Retransmission and flow control option" allows choosing a mode. The Bluetooth standard recommends establishing "reliable" connections that limit data loss, using a "Basic Mode" with an infinite "Flush Timeout", or in more recent Bluetooth stacks "ERTM" with any "Flush Timeout".

In practice, no product on the market offers a synchronized point-to-multipoint A2DP control function for any Bluetooth multimedia devices.

SUMMARY OF THE INVENTION

The invention aims at improving the situation.

The invention relates in particular to a Bluetooth device for controlling a plurality of wireless audio devices, comprising:

a wireless communication circuit, arranged to receive a wireless audio device identifier from each wireless audio device, each wireless audio device having characteristics;

a sound processing circuit for applying independent audio effects on a main audio stream such that the sound processing circuit outputs as many modified audio streams as the wireless communication circuit has received identifiers of wireless audio devices, on the basis of the characteristics of each wireless audio device;

an allocation circuit for allocating each modified audio stream to a respective wireless audio device, a transmission circuit for wirelessly transmitting through a Bluetooth usage each modified audio stream to said respective wireless audio device for emission by the wireless audio devices.

Such a device is particularly advantageous in that it is capable of extracting pertinent information concerning the wireless audio devices to which it is connected and of applying an audio effect to the main audio stream on the basis of this pertinent information. In the case where multiple wireless audio devices are connected to the device, the audio effects are applied independently from each other, and related to each wireless audio device, depending on the pertinent information.

In another aspect, the characteristics of the wireless audio devices comprise a spatial position of each wireless audio device.

In another aspect, the wireless communication circuit is arranged to detect a number of wireless audio devices for which the wireless communication circuit has received the identifiers, the sound processing circuit being arranged to apply independent audio effects on the main audio stream such that the sound processing circuit outputs as many modified audio streams as the number of wireless audio devices detected by the wireless communication circuit, on the basis of the characteristics of each wireless audio device.

In another aspect, the Bluetooth device also comprises an access circuit for accessing a protocol circuit of the wireless communication circuit, arranged to obtain from the protocol circuit of the wireless communication circuit characteristics of each wireless audio device, the modified multimedia streams being modified by the sound processing circuit on the basis of the characteristics relative to each wireless audio devices.

In another aspect, the Bluetooth device also comprises a database storing information about identifiers of audio devices and characteristics of audio devices, and in that it comprises an interrogation circuit for retrieving from the database characteristics of wireless audio devices associated with received audio device identifiers.

In another aspect, the sound processing circuit comprises a duplication circuit arranged to duplicate the main multimedia stream into as many duplicated multimedia streams as the wireless communication circuit has received identifiers of wireless multimedia devices, the sound processing circuit being arranged to apply audio effects respectively on each duplicated multimedia streams on the basis of the characteristics of each wireless multimedia device to output the modified multimedia streams.

In another aspect, the sound processing circuit comprises a separation circuit being arranged for separating the main multimedia stream into as many separated multimedia streams as the wireless communication circuit has received identifiers of wireless multimedia devices, the separated multimedia streams being the modified multimedia streams.

In another aspect, the sound processing circuit comprises a content extraction circuit for extracting the modified audio streams from the main audio stream.

In another aspect, the transmission circuit is adapted for wirelessly transmitting through a Bluetooth usage each modified audio stream to said respective wireless audio device for synchronized emission by the wireless audio devices According to another aspect, the invention relates to a method for controlling a plurality of wireless audio devices with a Bluetooth device, comprising:

receiving, at a wireless communication circuit, a wireless audio device identifier from each wireless audio device, each wireless audio device having characteristics;

applying, at a sound processing circuit, independent audio effects on a main audio stream such that the sound processing circuit outputs as many modified audio streams as the wireless communication circuit has received identifiers of wireless audio devices, on the basis of the characteristics of each wireless audio device;

allocating, at an allocation circuit, of each modified audio stream to a respective wireless audio device, wirelessly transmitting through a Bluetooth usage, at a transmission circuit, each modified audio stream to said respective wireless audio device for synchronized emission by the wireless audio devices.

In another aspect, the characteristics of the wireless audio devices comprise a spatial position of each wireless audio device.

In another aspect, an access circuit, for accessing a protocol circuit of the wireless communication circuit, obtains from the protocol circuit of the wireless communication circuit characteristics of each wireless multimedia device, the modified multimedia streams being modified by the sound processing circuit on the basis of the characteristics relative to each wireless multimedia devices.

In another aspect, a duplication circuit duplicates the main multimedia stream into as many duplicated multimedia streams as the wireless communication circuit has received identifiers of wireless multimedia devices, the sound processing circuit being arranged to apply audio effects respectively on each duplicated multimedia streams on the basis of the characteristics of each wireless multimedia device to output the modified multimedia streams.

In another aspect, a separation circuit, comprised in the sound processing circuit, separates the main multimedia stream into as many separated multimedia streams as the wireless communication circuit has received identifiers of wireless multimedia devices, the separated multimedia streams being the modified multimedia streams.

According to another aspect, the invention relates to a computer program comprising a series of instructions which, when executed by a processor, implement such a method.

According to another aspect, the invention relates to a computer-readable non-transitory storage medium storing such a computer program.

BRIEF DESCRIPTION OF THE DRAWINGS

Other features and advantages of the invention will be apparent from the following description. This description is purely illustrative and is to be read with reference to the appended drawings in which.

DESCRIPTION OF THE PREFERRED EMBODIMENTS

The following embodiments are examples. Although the description refers to one or more embodiments, this does not necessarily mean that each element mentioned in the context of one embodiment relates only to that embodiment, or that features of that embodiment apply only to that embodiment.

Figure 1:
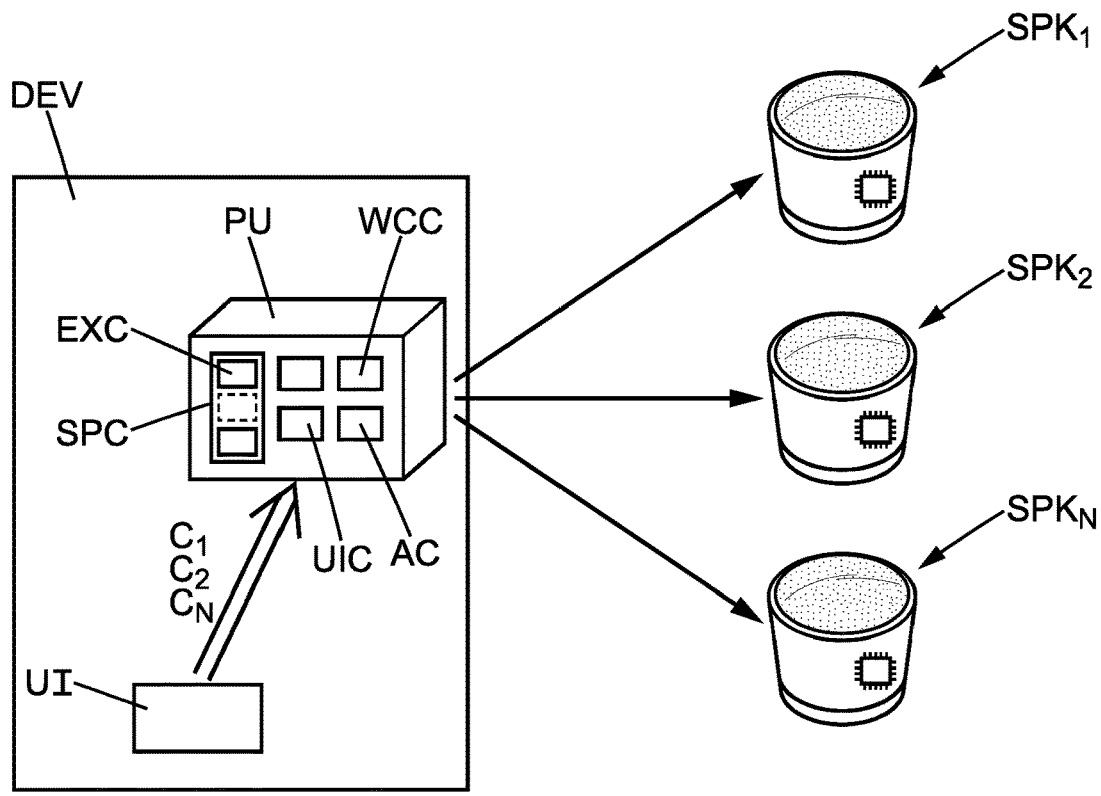
FIG. 1 illustrates a system comprising a device according to an embodiment of the invention as well as a set of Bluetooth speakers.

FIG. 1 illustrates a system comprising a Bluetooth device DEV for controlling wireless speakers according to an embodiment of the invention, as well as a set of wireless speakers $SPK_1$, $SPK_2$ and $SPK_N$. The device DEV comprises a processing unit PU. The processing unit PU comprises a wireless communication circuit WCC enabling communication with the wireless speakers $SPK_1$, $SPK_2$ and $SPK_N$. In particular, the wireless communication circuit is designed to receive an identifier $ID_1$, $ID_2$ and $ID_N$ from each wireless speaker, enabling identifying them. The processing unit PU comprises a user interface circuit UIC for accessing characteristics $C_1$, $C_2$, $C_N$ of the wireless speakers. The characteristics about the speakers are associated with the identifiers $ID_1$, $ID_2$ and $ID_N$ of the speakers $SPK_1$, $SPK_2$ and $SPK_N$. The processing unit PU comprises a sound processing circuit SPC for applying audio effects on a main audio stream to output as many modified audio streams as the processing unit PU has received wireless speaker identifiers, on the basis of the characteristics of the speakers. The processing unit PU comprises an allocation circuit AC for allocating each modified audio stream to a respective wireless speaker.

According to this example, as shown on FIG. 1, characteristics $C_1$, $C_2$, $C_N$ about the speakers are entered by a user of the Bluetooth device DEV into the user interface circuit UIC through a user interface UI of the device DEV.

For example, the identifiers $ID_1$, $ID_2$ and $ID_N$ of the speakers are also entered by a user of the Bluetooth device DEV into the user interface circuit UIC through the user interface UI of the device DEV.

By entering characteristics $C_1$, $C_2$, $C_N$ about the speakers and identifiers $ID_1$, $ID_2$ and $ID_N$ of the speakers through the user interface UI of the device DEV, characteristics $C_1$, $C_2$, $C_N$ about the speakers and identifiers $ID_1$, $ID_2$ and $ID_N$ of the speakers can easily be associated to one another.

Figure 2:
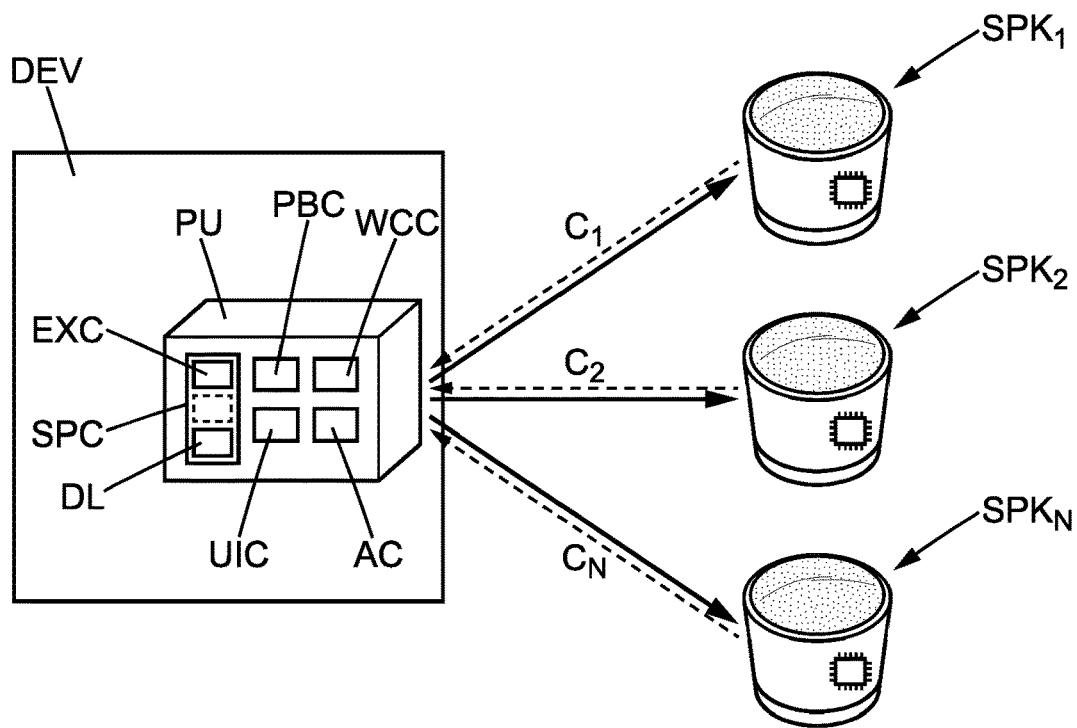
FIG. 2 illustrates a system comprising a device according to an embodiment of the invention as well as a set of Bluetooth speakers.

According to another example, as shown on FIG. 2, characteristics $C_1$, $C_2$, $C_N$ about the speakers are obtained from the Bluetooth communication of the Bluetooth device DEV with the wireless multimedia speakers $SPK_1$, $SPK_2$ and $SPK_N$.

According to this embodiment, the Bluetooth circuit device BC comprises an access circuit PBC arranged to obtain, from the Bluetooth communication of the Bluetooth device DEV with the wireless multimedia devices, characteristics $C_1$, $C_2$, $C_N$ of each wireless multimedia device.

For example, the identifiers $ID_1$, $ID_2$ and $ID_N$ of the speakers are also obtained from the Bluetooth communication of the Bluetooth device DEV with the wireless multimedia speakers $SPK_1$, $SPK_2$ and $SPK_N$. In this way, characteristics $C_1$, $C_2$, $C_N$ about the speakers and identifiers $ID_1$, $ID_2$ and $ID_N$ of the speakers can easily be associated to one another.

Figure 3:
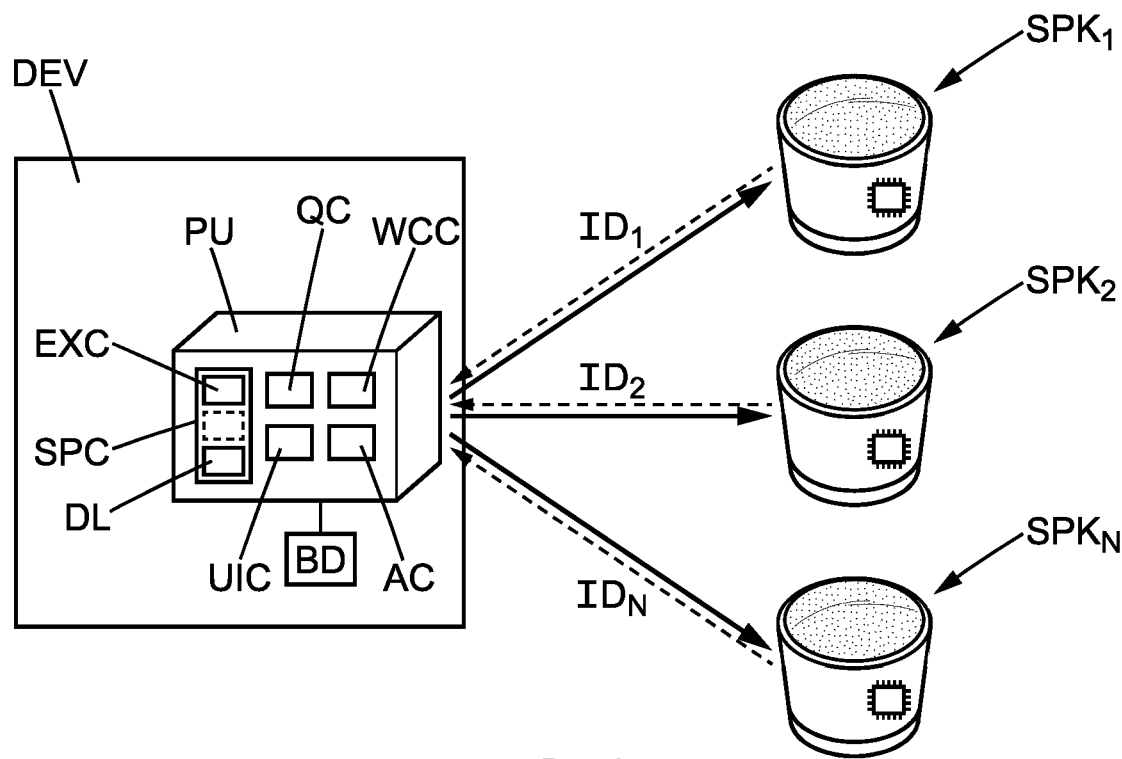
FIG. 3 illustrates a system comprising a device according to an embodiment of the invention as well as a set of Bluetooth speakers.

According to another example, as shown on FIG. 3, the Bluetooth device DEV comprises a database DB storing information about identifiers of audio devices and characteristics of audio devices. Based on identifiers $ID_1$, $ID_2$ and $ID_N$, the Bluetooth device DEV comprises an interrogation circuit QC for retrieving from the database DB characteristics $C_1$, $C_2$, $C_N$ of wireless audio devices associated with received audio device identifiers $ID_1$, $ID_2$ and $ID_N$. In this example, the identifiers $ID_1$, $ID_2$ and $ID_N$ could for example be entered by a user of the Bluetooth device DEV into the user interface circuit UIC through the user interface UI of the device DEV as in the above example of FIG. 1, or obtained from the Bluetooth communication of the Bluetooth device DEV with the wireless multimedia speakers $SPK_1$, $SPK_2$ and $SPK_N$, as in the above example of FIG. 2. The characteristics $C_1$, $C_2$, $C_N$ of wireless audio devices are thus easily associated with received audio device identifiers $ID_1$, $ID_2$ and $ID_N$.

According to one example, one may obtain identifiers and/or characteristics about the speakers using two or more of the above variants.

The characteristics $C_1$, $C_2$, $C_N$ comprise for example the spatial positions $COORD_1$, $COORD_2$, $COORD_n$ of the wireless multimedia devices. By "spatial position", it is understood the relative location and/or orientation in 3D-space of a given speaker with respect to the Bluetooth device DEV.

According to another example, the characteristics $C_1$, $C_2$, $C_N$ of the wireless multimedia devices include the volume, the signal strength of the Bluetooth signal between the Bluetooth device and the remote speaker, and/or whether the noise cancelling feature of the speaker is activated.

According to an example, the characteristics $C_1$, $C_2$, $C_N$ of the wireless multimedia devices other than the spatial positions of the wireless multimedia devices can be processed to evaluate the spatial positions $COORD_1$, $COORD_2$, $COORD_n$ of the wireless multimedia devices. For example, the signal strength values can be used to evaluate the distance between a remote speaker and the Bluetooth device.

According to another example, the characteristics $C_1$, $C_2$, $C_N$ of the wireless multimedia devices include an audio transfer function of the speaker. An audio transfer function is a function describing how an audio signal entering the speaker is emitted by the speaker.

According to yet another example, the characteristics $C_1$, $C_2$, $C_N$ of the wireless multimedia devices include a latency of the wireless multimedia device.

Generally speaking, a remote speaker may communicate to the Bluetooth device DEV a unique identifier, an identifier of its model, to which are linked some overall characteristics of speakers of this model, which are the same for different speakers of the same model (such as a transfer function of the speaker, a maximum volume, . . . ), and/or instant characteristics specific to the current use of the speaker (for example the volume and/or the activation of the noise cancelling feature, . . . ).

The Bluetooth circuit BC comprises a sound processing circuit SPC for applying audio effects on an audio stream to output as many modified multimedia streams as the Bluetooth circuit BC has received (via its wireless communication circuit) wireless multimedia devices identifiers.

According to one example, the modified multimedia streams are obtained by a content extraction circuit comprised in the sound processing circuit SPC. For example, the multimedia stream is or comprises a main audio stream, and the main audio stream comprises a plurality of distinct multiplexed streams (for example center channel, left channel and right channel), and the extraction consists of extracting each of these channels from the main audio stream. This example may especially be applied when the characteristics of each speaker comprise the spatial positions $COORD_1$, $COORD_2$, $COORD_n$ of the speakers. Alternately, the main audio stream is an incoming stream, for example a mono or a stereo stream, and the content extraction circuit EXC is configured to extract a given number of channels, for example more than two channels from the incoming stream, each extracted channel being provided to a respective speaker so as to provide a surround effect.

According to another embodiment, the sound processing circuit SPC comprises a duplication circuit DC arranged to duplicate the main audio stream into as many duplicated audio streams as the Bluetooth circuit BC has received identifiers of speakers. The sound processing circuit SPC applies audio effects respectively on each duplicated audio stream on the basis of the characteristics $C_1$, $C_2$, $C_N$ of the speakers. This example may especially be applied when the characteristics of each speaker comprise another characteristic of the speaker than the spatial positions $COORD_1$, $COORD_2$, $COORD_n$ of the speakers. Yet, in this example, the characteristics of each speaker may comprise, in addition to this characteristic of the speaker other than the spatial positions $COORD_1$, $COORD_2$, $COORD_n$ of the speakers, the spatial positions $COORD_1$, $COORD_2$, $COORD_n$ of the speakers as an additional characteristic on which the audio effect is based.

According to one embodiment, one may for example both extract channels from the main audio stream through the content extraction circuit based on the spatial positions $COORD_1$, $COORD_2$, $COORD_n$ of the speakers, and apply to each extracted channel an audio effect based on a characteristic of the speaker at least other than the spatial positions $COORD_1$, $COORD_2$, $COORD_n$ of the speakers.

For example, the sound processing circuit SPC may apply an audio effect to, for example, modify the amplitude of the signal for some frequency bands, or the volume of the sub-stream, taking into account the distance of the speaker to the Bluetooth device DEV.

According to another example, the sound processing circuit SPC may apply an audio effect to, for example, modify the amplitude of the signal for some frequency bands, or the volume of the sub-stream, taking into account the transfer function of the speaker.

The sound processing circuit SPC can operate independently of the identifiers $ID_1$, $ID_2$ and $ID_N$ of the speakers. In particular, the sound processing circuit SPC can apply each audio effect without knowing to which particular speaker the resulting stream will be sent.

The allocation circuit AC allocates each modified multimedia stream to a respective speaker.

For example, the allocation circuit AC allocates each modified multimedia stream according to the spatial position of the wireless multimedia devices. For example, three wireless speakers are arranged in a room, with the Bluetooth device DEV in the center of the room, and the three wireless multimedia devices framing the Bluetooth device DEV, respectively in front, on his left and on his right sides. The left, the right and the center channels are extracted from the main multimedia device. The left channel will then be allocated to the wireless multimedia device on the left of the Bluetooth device DEV. The right channel will be allocated to the wireless multimedia device on the right of the Bluetooth device DEV, and the central channel will be allocated to the central wireless multimedia device, to perform a surround sound experience.

The wireless communication circuit WCC then wirelessly transmits through a Bluetooth usage each sub-stream to said respective wireless audio device for synchronized emission by the wireless audio devices, in a way which will be described in a more precise manner below in reference to FIGS. 6 to 8.

Figure 4:
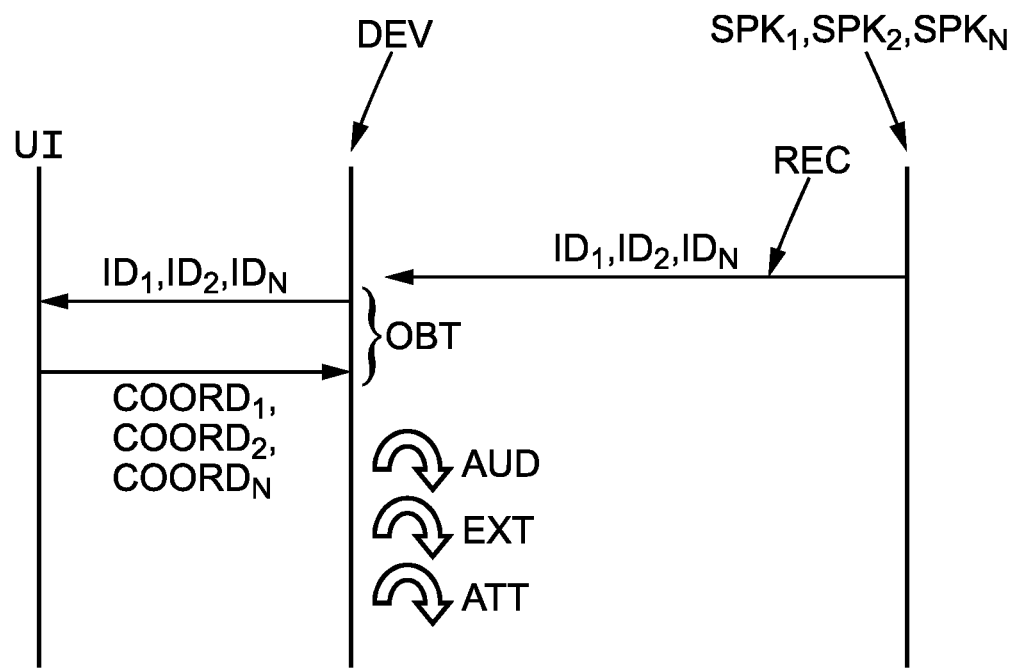
FIG. 4 illustrates a sound processing method according to an embodiment of the invention.

FIG. 4 illustrates a method according to an embodiment of the invention.

The method comprises receiving REC, via a wireless communication circuit WCC, identifiers $ID_1$, $ID_2$ and $ID_N$ of wireless speakers $SPK_1$, $SPK_2$ and $SPK_N$.

For each of these identifiers $ID_1$, $ID_2$ and $ID_N$, the method comprises a step OBT of obtaining the characteristics $COORD_1$, $COORD_2$ and $COORD_N$. For example, by means of a user interface UI, the user can enter the respective characteristics of the speakers $SPK_1$, $SPK_2$ and $SPK_N$. such as, for example: "left", "right", "front", . . .

The method then comprises a step AUD of applying audio effects on a main audio stream, where a number of audio sub-streams, that is equal to the number of wireless speakers detected (for which the device has received the identifiers), are obtained EXT from the main audio stream.

The method then comprises a step ATT of allocating each sub-stream to a respective wireless speaker.

The method then comprises wirelessly transmitting through a Bluetooth usage each sub-stream to said respective wireless audio device for synchronized emission by the wireless audio devices.

Figure 5:
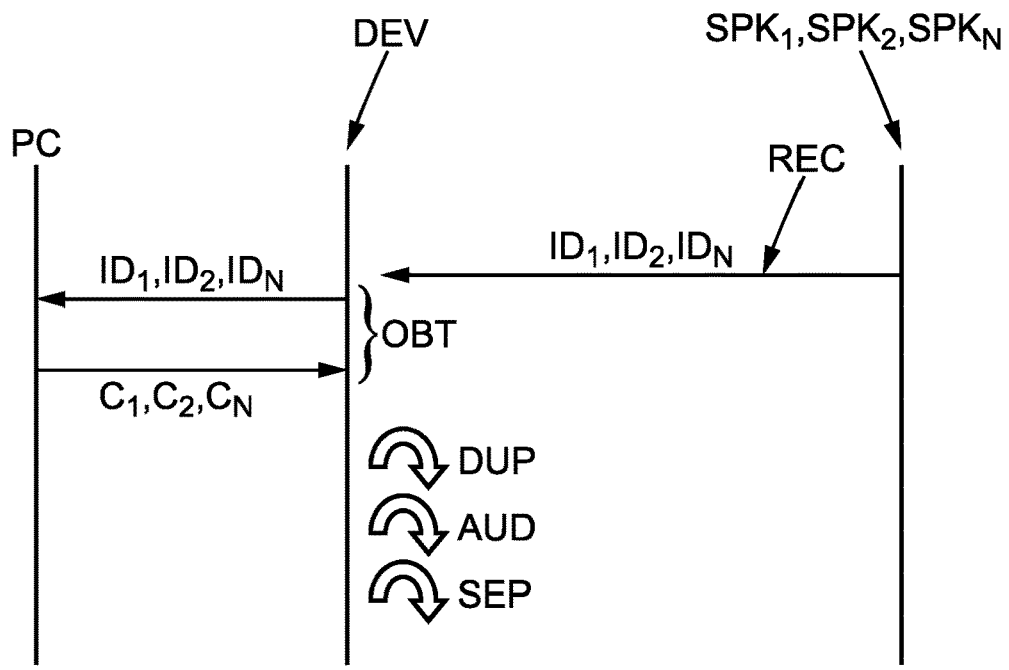
FIG. 5 illustrates a sound processing method according to an embodiment of the invention.

FIG. 5 illustrates a method according to an embodiment of the invention.

The method comprises receiving REC, via a wireless communication circuit BC, the identifiers $ID_1$, $ID_2$ and $ID_N$ of wireless speakers $SPK_1$, $SPK_2$ and $SPK_N$.

For these identifiers $ID_1$, $ID_2$ and $ID_N$, the method comprises a step OBT of obtaining the characteristics $C_1$, $C_2$ and $C_N$ of the speakers $SPK_1$, $SPK_2$ and $SPK_N$, from the Bluetooth communication of the Bluetooth device DEV with the wireless multimedia devices. For example, the characteristics $C_1$, $C_2$ and $C_N$ is a Boolean variable indicating whether the noise cancelling feature of the speaker is activated.

The method then comprises a step DUP of duplicating an audio stream into a number of audio sub-streams that is equal to the number of wireless speakers detected (for which the Bluetooth device has received the identifiers). The method then comprises a step AUD of applying audio effects on each audio sub-stream, on the basis of the characteristics $C_1$, $C_2$, $C_N$ of the speakers. Especially, if the noise cancelling feature of a given speaker is activated, an audio effect will be applied to this sub-stream to take into account this characteristic, which will be different from the audio effect applied on a sub-stream processed for a speaker of which the noise cancelling feature is not activated.

The method then comprises a step ATT of allocating each sub-stream to a respective wireless speaker.

As an alternative, the step DUP of duplicating an audio stream is not performed. According to this alternative, the audio stream is separated into a number of audio sub-streams that is equal to the number of wireless speakers detected (for which the method has received the identifiers). Then, the method comprises a step AUD of applying audio effects on each audio sub-stream, on the basis of the characteristics $C_1$, $C_2$, $C_N$ of the speakers.

As an additional embodiment, it is possible to apply an audio effect to the main audio stream, before the main audio stream is separated into audio sub-streams.

The method then comprises a step ATT of allocating each sub-stream to a respective wireless speaker.

The method then comprises wirelessly transmitting through a Bluetooth usage each sub-stream to said respective wireless audio device for synchronized emission by the wireless audio devices.

Figure 6:
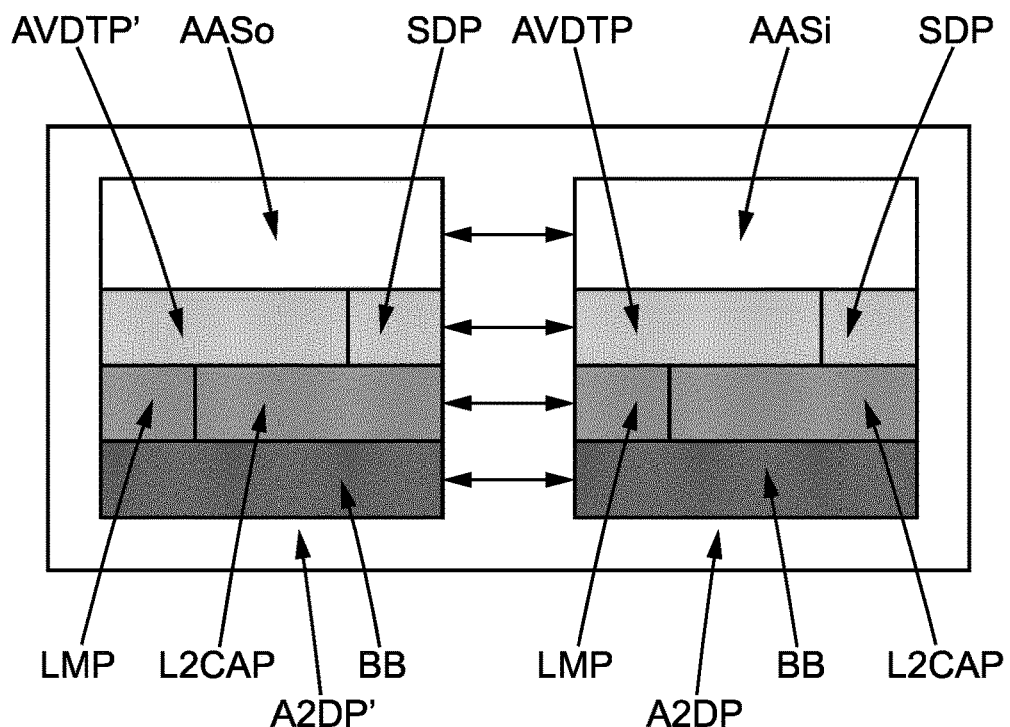
FIG. 6 illustrates a conventional A2DP profile, as well as an A2DP' profile according to an embodiment of the invention arranged to communicate with the conventional A2DP profile.

FIG. 6 illustrates a communication between a profile A2DP' according to an embodiment of the invention, said profile used by a master device called a "Source" (which corresponds to a device emitting an audio stream), and a conventional A2DP profile used by a Sink device. The Sink device corresponds for example to a Bluetooth speaker, it being understood that a Bluetooth speaker can comprise multiple Sink SEPs (multiple Sink SEPs can therefore correspond to the same Bluetooth speaker, each Sink SEP being able to correspond to a respective codec among all the codecs supported by that Bluetooth speaker).

In practice, the Bluetooth stacks of Bluetooth chip manufacturers only introduce one Source SEP per codec and per Bluetooth chip. It is therefore impossible to connect several audio devices (speakers for example) to a mobile phone, for a given codec.

The A2DP' profile differs from the A2DP profile in that an AVDTP' layer is used instead of the AVDTP layer. The AVDTP' layer provides all the functions of the AVDTP layer but in addition it allows a synchronized point-to-multipoint connection.

Figure 7:
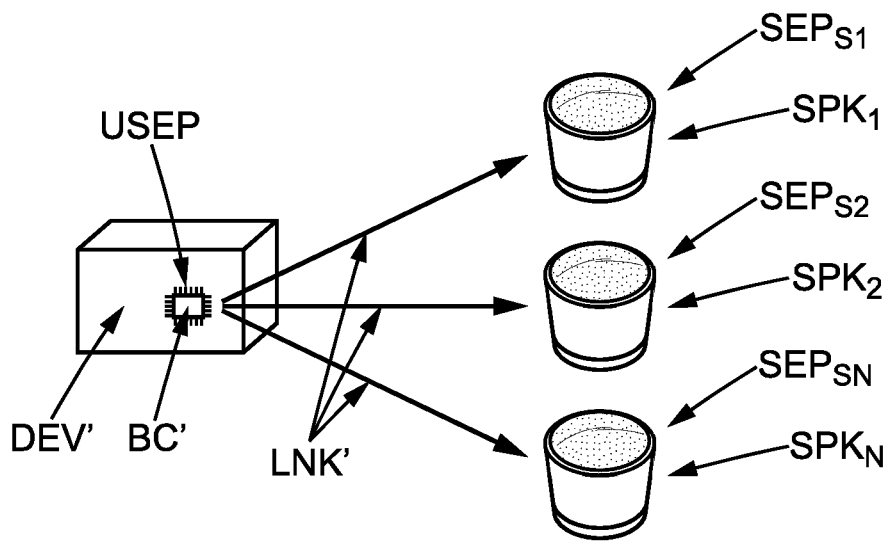
FIG. 7 illustrates a system comprising a device according to an embodiment of the invention as well as a set of Bluetooth speakers.

FIG. 7 illustrates a system comprising at least three Bluetooth speakers $SPK_1$, $SPK_2$ and $SPK_N$ each associated with a respective Sink SEP $SPE_{S1}$, $SEP_{S2}$, $SEP_{SN}$ (as mentioned above, each speaker $SPK_i$ could be associated with multiple Sink SEPs rather than a single Sink SEP $SEP_{Si}$, but for simplification only the Sink SEP actually used is represented). The system also comprises a device DEV' for controlling Bluetooth speakers according to one possible implementation of the invention. The device DEV' comprises a Bluetooth chip BC'. This Bluetooth chip BC' stores a unique SEP USEP identifying it. This Bluetooth chip BC' establishes a point-to-multipoint link LNK' with the three Bluetooth speakers $SPK_1$, $SPK_2$ and $SPK_N$, via respective SEPs $SEP_{S1}$, $SEP_{S2}$ and $SPE_{SN}$.

Figure 8:
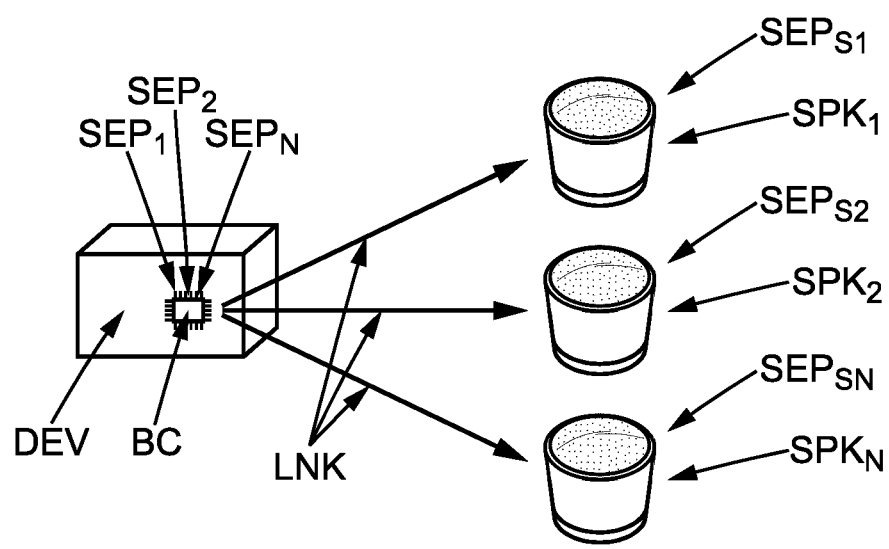
FIG. 8 illustrates a variant of the system of FIG. 7.

FIG. 8 illustrates a system comprising at least three Bluetooth speakers $SPK_1$, $SPK_2$ and $SPK_N$ each associated with a respective Sink SEP $SPE_{S1}$, $SEP_{S2}$, $SEP_{SN}$ (as mentioned above, each speaker $SPK_i$ could be associated with multiple Sink SEPs rather than a single Sink SEP $SEP_{Si}$, but for simplification only the Sink SEP actually used is represented). The system also comprises a device DEV for controlling Bluetooth speakers according to one possible implementation of the invention. The device DEV comprises a Bluetooth chip BC. This Bluetooth chip BC stores at least three SEPs $SEP_1$, $SEP_2$ and $SEP_N$ which simulate three different Bluetooth chips (but these are virtual Bluetooth chips because there is actually only one). The Bluetooth chip BC establishes a point-to-multipoint link LNK with the at least three Bluetooth speakers $SPK_1$, $SPK_2$ and $SPK_N$, but from the point of view of the Bluetooth standard, this link LNK appears to be a set of (at least) three point-to-point links. In effect, the SEP $SEP_1$ is connected to an SEP $SEP_{S1}$ of speaker $SPK_1$, the SEP $SEP_2$ is connected to an SEP $SEP_{S2}$ of speaker $SPK_2$, and the SEP $SEP_N$ is connected to an SEP $SEP_{SN}$ of speaker $SPK_N$.

A first embodiment relates to a device DEV for controlling wireless multimedia devices. The wireless multimedia devices are, for example, speakers $SPK_1$, $SPK_2$, $SPK_N$. However, a wireless multimedia device may also be, for example, a mobile phone comprising a speaker capable of acting as a loudspeaker and also comprising a screen suitable for streaming a video. A wireless multimedia device may also be a television comprising a wireless interface such as WiFi or Bluetooth, a computer comprising a wireless network card (WiFi, Bluetooth, etc.), or a WiFi or Bluetooth tablet. The control device DEV is, for example, a dedicated device, or an optional additional module to be attached to one of the multimedia devices (for example to one of the wireless speakers). The control device DEV may also be, for example, a computer, a mobile phone, or a tablet.

A wireless communication circuit WCC of the Bluetooth device DEV is arranged to receive a wireless multimedia device identifier from each wireless multimedia device. The providing of identification compensates for the fact that the multimedia devices are unknown. A Bluetooth speaker (or more generally a Bluetooth device) automatically provides an identifier when it connects to a master device. It is therefore not necessary to modify the Bluetooth speaker (a state of the art Bluetooth speaker is suitable for the invention).

The Bluetooth device DEV comprises a sound processing circuit SPC for outputting as many modified multimedia streams as the control device has received (via its wireless communication circuit) wireless multimedia devices identifiers, as explained above.

The Bluetooth device DEV comprises an allocation circuit AC for allocating each modified multimedia stream to a respective wireless multimedia device. According to one possible implementation, the allocation circuit is called upon first, and it is only after the sub-streams are allocated that these sub-streams are obtained from the main stream. Alternatively, the Bluetooth device DEV begins by generating the modified sub-streams, and then it allocates these modified sub-streams.

The allocation circuit AC allocates each modified multimedia stream to a respective wireless multimedia device, as described above.

As discussed above, the device DEV is arranged to recreate, from a single stream or from several streams, a greater number of streams. For example, the separation circuit can recreate a multichannel environment (for example 5.1 surround sound) from a single channel (by signal processing).

Figure 9:
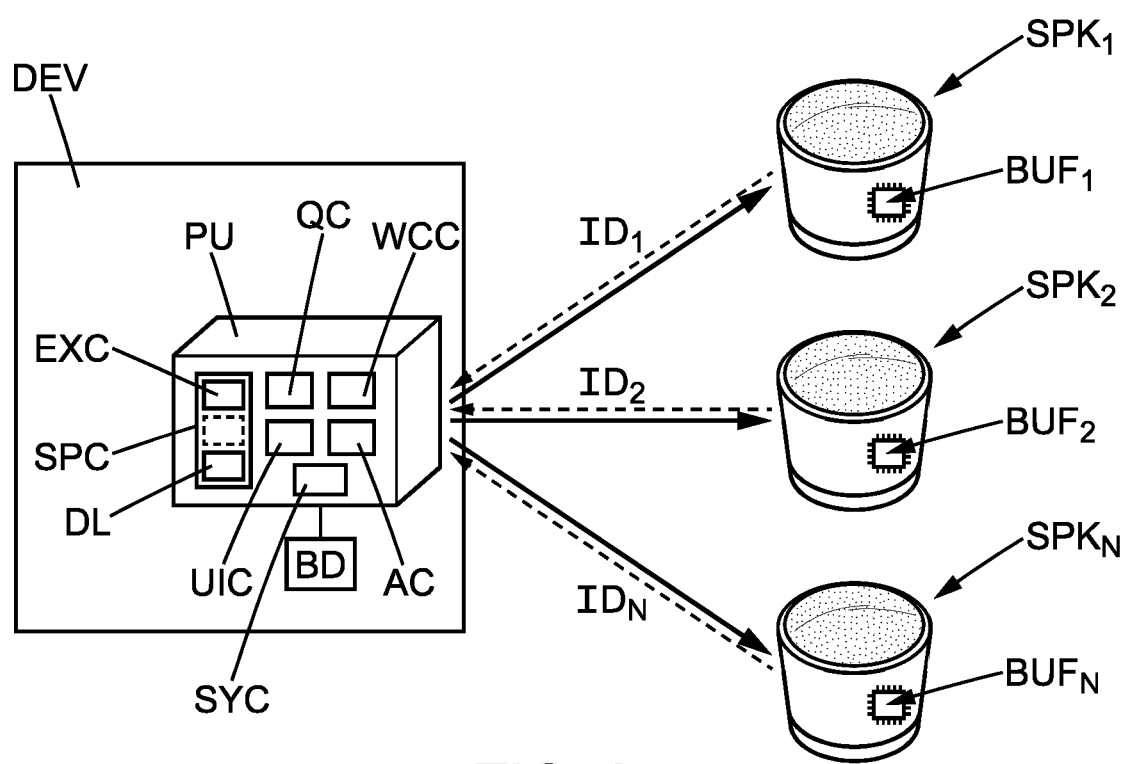
FIG. 9 illustrates a system comprising a device according to an embodiment of the invention as well as a set of Bluetooth speakers.

FIG. 9 illustrates a system comprising the device DEV for controlling wireless speakers according to an embodiment of the invention, as well as a set of wireless speakers $SPK_1$, $SPK_2$ and $SPK_N$ each comprising a respective buffer memory $BUF_1$, $BUF_2$ and $BUF_N$. The device DEV comprises a synchronization circuit SYC for synchronizing the separated audio streams based on characteristics of the wireless speakers for which the wireless communication circuit has received an identifier.

After the allocating step ATT, the method comprises a synchronization step which ensures that the audio from the different sub-streams is played simultaneously by all the wireless speakers.

According to an embodiment, the characteristics of each wireless multimedia device $SPK_1$, $SPK_2$, $SPK_N$ of a device for controlling wireless multimedia devices according to the first embodiment include a latency of said multimedia device. The synchronization circuit SYC is arranged to temporally shift the transmission of a separated multimedia stream intended for a wireless multimedia device, based on its latency. This embodiment eliminates one of the two main causes of desynchronization, namely the difference in internal latency. The proposed synchronization is a synchronization that can be described as static, as it is based on static characteristics such as the latency of the multimedia device. This latency is defined, for example, as the time that elapses between the moment when the wireless multimedia device receives a stream and the moment when that stream is actually reproduced by the wireless multimedia device. This time is fixed for wireless speakers. Moreover, for a given slave device, the database may include a plurality of possible latencies. For instance, each internal latency associated to a given slave device is associated to a specific codec used for encoding and decoding the data exchanged between the master device and the slave device using their Bluetooth link. For all or part of the possible codecs, and for at least one slave device, a plurality of internal latencies may be present in the database DB. In fact, for a given codec, the internal latency of a slave device may vary from one configuration of the codec to another. Various configuration parameters may indeed influence latency, such as the quality of sound, the number of sound channels (e.g. mono, stereo) used, etc. At a given time, the specific codec used for a given slave device and its configuration is known from the master device, whereby this information is accessible to the latter. Different wireless multimedia devices have different latencies, and the static synchronization takes them into account in order to eliminate the time lags associated with these differences in latency.

Another possible cause of desynchronization is related to a loss of connection between the device for controlling wireless multimedia devices and at least one wireless multimedia device. This is a desynchronization that can be described as dynamic, as it depends on the particular context in which the multimedia stream concerned is reproduced (noise, interference, introduction of an object impeding wireless transmission, moving a portable multimedia device outside the field of the control device DEV, etc.). Under these circumstances, a wireless multimedia device which loses its connection with the control device is no longer synchronized with the other wireless multimedia devices when the connection with the control device is restored. In principle, this wireless multimedia device is receiving the lost packets even though the subsequent packets are being sent at the same time to the other wireless multimedia devices. To avoid this type of desynchronization, a first technique consists of never retransmitting lost multimedia stream packets. But in circumstances where the retransmission of such lost packets would have been possible, this unnecessarily degrades the playback quality of the multimedia stream. It is useful in some circumstances, however. For example, some wireless multimedia devices have limited protocol capabilities. For example, they may support a basic protocol that manages only the transmission of packets and does not check whether the sent packets have reached their destination and have arrived intact, and so do not attempt to retransmit lost packets (ignoring the existence of packet loss). They may also support a reliable protocol which does not allow any packet loss (when loss or corruption is detected, the packet is resent). But such a reliable protocol is likely to block communications if the wireless multimedia device is not reachable, because it endlessly attempts to resend the lost packets. If the database indicates that a wireless multimedia device supports only a basic protocol and a reliable protocol of the aforementioned types, in one possible implementation the control device chooses the basic protocol, accepting the risk of lost packets, in order to preserve the synchronization (a desynchronized packet is often more of a nuisance than a missing packet).

According to an embodiment, a method for controlling wireless multimedia devices comprises the receiving REC, by a wireless communication circuit, of a wireless multimedia device identifier $ID_1$, $ID_2$, $ID_N$ from each wireless multimedia device $SPK_1$, $SPK_2$, $SPK_N$. According to one possible implementation, the wireless communication circuit is a Bluetooth chip. According to one implementation, the wireless communication circuit is an assembly composed of a processor associated with a memory storing an appropriate computer program. According to another implementation, the communication circuit is a dedicated electronic chip, which is for example an FPGA or any other suitable circuit, including a custom-designed ad hoc circuit. According to a variant, the method is partially implemented by a dedicated electronic chip such as the aforementioned dedicated chips, and partially by a processor executing a suitable computer program.

The method comprises the obtaining OBT, by a user interface circuit UIC for accessing data entered by a user via a user interface UI, the characteristics $COORD_1$, $COORD_2$ and $COORD_N$ of each wireless multimedia device. According to one implementation, the obtaining circuit is an assembly composed of a processor associated with a memory storing an appropriate computer program. According to another implementation, the obtaining circuit is a dedicated electronic chip, which is for example an FPGA or any other suitable circuit, including a custom-designed ad hoc circuit. According to a variant, the invention is partially implemented by a dedicated electronic chip such as the aforementioned dedicated chips, and partially by a processor executing a suitable computer program.

The method comprises the application AUD of audio effects on a main multimedia stream by a sound processing circuit SPC, such that the sound processing circuit SPC output as many modified multimedia streams as the wireless communication circuit BC has received identifiers of wireless multimedia devices.

The modified multimedia streams can be obtained by the extraction EXT of streams of the main multimedia stream, by a content extraction circuit EXC, which is comprised in the sound processing circuit SPC. According to one implementation, the content extraction circuit EXC is an assembly composed of a processor associated with a memory storing an appropriate computer program. According to another implementation, the content extraction circuit EXC is a dedicated electronic chip, which is for example an FPGA or any other suitable circuit, including a custom-designed ad hoc circuit. According to a variant, the invention is partially implemented by a dedicated electronic chip such as the aforementioned dedicated chips, and partially by a processor executing a suitable computer program.

The method comprises the allocation ATT, by an allocation circuit AC, of each modified multimedia stream to a respective wireless multimedia device. According to one implementation, the allocation circuit AC is an assembly composed of a processor associated with a memory storing an appropriate computer program. According to another implementation, the allocation circuit is a dedicated electronic chip, which is for example an FPGA or any other suitable circuit, including a custom-designed ad hoc circuit. According to a variant, the invention is partially implemented by a dedicated electronic chip such as the aforementioned dedicated chips, and partially by a processor executing a suitable computer program.

According to one possible implementation, the wireless communication circuit, the user interface circuit, the sound processing circuit including the extraction circuit and the allocation circuit share the same processor or even the same memory chip (in the latter case, the memory chip can store computer programs specific to each of these circuits, at different addresses).

In alternative or in addition, the main multimedia stream is duplicated by a duplication circuit DC, comprised in the sound processing circuit SPC, into as many duplicated multimedia streams as the wireless communication circuit BC has received identifiers of wireless multimedia devices.

The method comprises the application AUD of audio effects on the duplicated multimedia streams by a sound processing circuit SPC, such that the sound processing circuit SPC output as many modified multimedia streams as the wireless communication circuit BC has received identifiers of wireless multimedia devices.

According to one implementation, the duplication circuit DC is an assembly composed of a processor associated with a memory storing an appropriate computer program. According to another implementation, the duplication circuit DC is a dedicated electronic chip, which is for example an FPGA or any other suitable circuit, including a custom-designed ad hoc circuit. According to a variant, the invention is partially implemented by a dedicated electronic chip such as the aforementioned dedicated chips, and partially by a processor executing a suitable computer program.

According to one possible implementation, the wireless communication circuit, the accessing circuit, the sound processing circuit including the duplication circuit and the allocation circuit share the same processor or even the same memory chip (in the latter case, the memory chip can store computer programs specific to each of these circuits, at different addresses).

A computer program comprises a series of instructions which, when executed by a processor, implement a method according to one of the first to fourth embodiments. This computer program is written, for example, in a low-level language such as an assembly language, or in a higher level and more portable language such as the C language. According to one possible implementation, the computer program is divided into a plurality of modules. According to one possible implementation, the various modules are all written in the same language, for example the C language or an assembly language. Alternatively, some modules are written in different languages, for example some modules are written in C, others in an assembly language. According to one possible implementation, all the modules are stored in the same memory. Alternatively, some modules are stored in separate memories.

A computer-readable non-transitory storage medium stores a computer program as described above.

According to one possible implementation, the storage medium is a USB key, an SD card, or a micro SD card. In a variant, the storage medium is any memory card. In another variant, the storage medium is a memory chip which is intended to be mounted on an electronic circuit. These include, for example, an EEPROM, ROM, or Flash memory. According to one possible variant, the storage medium is a magnetic medium (for example hard drive) or optical medium (for example CD or DVD).

luetooth multimedia devices are, for example, Bluetooth speakers. "Bluetooth speaker" indicates any Bluetooth device containing at least one loudspeaker arranged to broadcast a sound that can be simultaneously heard by multiple people. It may, for example, be an acoustic speaker for a hi-fi system, or a mobile phone equipped with a loudspeaker intended to be audible to multiple people, provided that it is this loudspeaker that is controlled by the control device. More precisely, "sound that can be simultaneously heard by multiple people" is understood to mean a sound that is perceptible (in the sense that its content can be distinguished) by any person with normal hearing positioned at a distance of at least one meter from the speaker, in the presence of ambient noise corresponding to that of a conversation, meaning approximately 40 dB SPL. A headset, an ear bud, or a telephone receiver are therefore not speakers within the meaning of the present application, since they must be positioned in or against the ear in order to hear the emitted sounds.

According to one possible implementation, the Bluetooth multimedia devices are Bluetooth headsets. Such headsets are for example connected with a television and need to be synchronized with each other in addition to being synchronized with a video stream playing on the television.

More generally, each of the Bluetooth multimedia devices can be a Bluetooth television, a Bluetooth screen, a Bluetooth mobile phone, a Bluetooth laptop or desktop, a Bluetooth tablet, a Bluetooth hi-fi system, a Bluetooth car stereo, or a Bluetooth digital media player.

The control device DEV or DEV' is, for example, a Bluetooth television, a Bluetooth screen, a Bluetooth mobile phone, a Bluetooth laptop or desktop, a Bluetooth tablet, a Bluetooth hi-fi system, a Bluetooth car stereo, or a Bluetooth digital media player.

The Bluetooth chip (for example BC or BC' in the figures) is arranged to implement a modified A2DP profile (denoted A2DP' in FIG. 6) so as to create a point-to-multipoint link (for example LNK or LNK') from said Bluetooth chip to a plurality of Bluetooth multimedia devices $SPK_1$, $SPK_2$, $SPK_N$. The Bluetooth chip of the control device is arranged to transmit a plurality of multimedia streams related to each other, each intended for a respective Bluetooth multimedia device among said plurality of Bluetooth multimedia devices, while relying on a non-blocking usage of Bluetooth. It is understood that multimedia streams "related to each other" means that the multimedia streams relate to the same situation (for example the same scene or the same music) but may nevertheless be different. For example, the multimedia streams can be six audio streams each corresponding to one of the 5.1 channels of an audio recording, or can be several videos of the same scene, filmed at the same time but from different viewpoints. The control device is for example arranged to transmit an audio stream (or more generally a multimedia stream) via a Bluetooth wireless link. For example, it stores or relays a multimedia stream comprising at least an audio channel. For example, it stores MP3 files, or connects to a server (such as a Youtube® server) from which it downloads a stream that it progressively and simultaneously retransmits via Bluetooth to multiple Bluetooth multimedia devices.

By relying on a non-blocking usage of Bluetooth instead of the blocking usage that is the default in A2DP, the control device avoids loss of synchronization. "Non-blocking usage of Bluetooth" is understood to mean any configuration of Bluetooth (via a Bluetooth mode and/or via other Bluetooth parameters) that does not block the Bluetooth chip of the device for controlling Bluetooth multimedia devices. A non-blocking usage of Bluetooth is therefore a use of Bluetooth which avoids forcing the Bluetooth chip to retransmit an unreceived packet as long as it has not been received, and which also avoids forcing it to retransmit such a packet beyond the moment when at least one Bluetooth multimedia device no longer has data in its buffer memory due, for example, to unsuccessful packet retransmission attempts monopolizing the Bluetooth communications. A non-blocking usage corresponds to a set of parameters (FTO, QoS, Mode, Extended Flow features) and not only to a mode (such as SM mode) in the sense of the Bluetooth standard. This involves for example the "Flow Control" mode or any mode in which the "Flush Timeout" parameter is set according to the Bluetooth standard to prevent any retransmission. Conversely, a blocking usage is a usage which leads, for example, to retransmitting data as long as it has not been received, or which leads to retransmitting data when a higher priority Bluetooth multimedia device is also awaiting data and has not received them because of said use (it is therefore blocked). Blocking usage is used in the prior art because it avoids occasional data losses (in the event of a prolonged cutoff for a period exceeding a given threshold, blocking usage does not prevent loss of data). In the assumption that Bluetooth is adapted to allow point-to-multipoint streaming, employing a non-blocking usage eliminates the risk of a Bluetooth multimedia device becoming inaccessible and preventing any transmission of data to all the Bluetooth multimedia devices. A Bluetooth multimedia device may become inaccessible for example because it has been moved out of range of the Bluetooth chip of the control device DEV, or because it contains a battery that has been exhausted, or for any other reason.

The default Bluetooth L2CAP settings mentioned in the introduction are not suitable for setting up an A2DP synchronized link of a Bluetooth master device to multiple Bluetooth slave devices. Indeed, if one of the links established between the master and a slave (for example a speaker) is configured with an infinite "Flush Timeout", and if the speaker leaves the Bluetooth field or is powered by a battery which is then exhausted, then the data will be continually sent to the speaker which never receives it and will therefore block any other transmission of data to the other slave devices (as the data are sent sequentially). On the other hand, if the "Flush Timeout" parameter is defined by default, the resending of data to a speaker could cause a time lag between this speaker and the others. When a speaker that has left the Bluetooth field of the master Bluetooth device returns to said field, it would then continue broadcasting the stream from the point where it had stopped due to leaving said field.

According to one possible implementation, the device for controlling Bluetooth multimedia devices is arranged to determine automatically, from the different configurations supported by the Bluetooth stacks of the Bluetooth multimedia devices, the configuration to be adopted for each L2CAP channel (corresponding to a logical link between the Bluetooth chip of the device for controlling Bluetooth speakers and a Bluetooth multimedia device) so as to maintain a synchronized link between the device for controlling Bluetooth multimedia devices and the various slave multimedia devices. The L2CAP parameters of each of the multimedia devices may be different (they may depend on the characteristics of these multimedia devices, their ability to support certain protocols, etc.).

According to one possible implementation, the device for controlling Bluetooth multimedia devices is arranged to set all the Flush Timeouts for the various L2CAP channels to the value defined by the Bluetooth standard (namely 1, but this could vary depending on the implementations) so that no retransmission is performed. The connection thus obtained is unreliable in the sense that transmission errors or losses are not remedied, but ensures synchronization after any packet loss.

According to an embodiment, the device for controlling Bluetooth multimedia devices is arranged, when a multimedia stream packet that it transmitted to a Bluetooth multimedia device is lost, to resend said multimedia stream packet to said Bluetooth multimedia device. The Bluetooth chip is arranged to determine a fill rate of a buffer memory of at least one Bluetooth multimedia device $SPK_1$, $SPK_2$, $SPK_N$ and to determine a maximum duration during which it can resend the lost multimedia stream packet to the Bluetooth multimedia device according to the fill rate of the buffer memory of the at least one Bluetooth multimedia device.

According to a possible implementation, this maximum duration corresponds to the least filled buffer memory among the buffer memories of all the other Bluetooth multimedia devices, for which it must deduce the time necessary for transmitting a sufficient portion of the multimedia stream.

Therefore the content of the buffer memory of the Bluetooth multimedia device that lost a packet is not taken into account.

According to another implementation, this maximum duration corresponds to the least filled buffer memory among the buffer memories of all the Bluetooth multimedia devices (including the one that lost the packet), for which it must deduce the time necessary for transmitting a sufficient portion of the multimedia stream. In fact, if the Bluetooth multimedia device that lost the packet runs the risk of running out of multimedia stream data to play, it can be considered more appropriate to abandon the attempt to retransmit the lost packet, which in any case would be restored as delayed and thus desynchronized from the other Bluetooth multimedia devices. According to another implementation, the device DEV is arranged to identify the Bluetooth multimedia devices for which it is unnecessary to verify the fill rate of the buffer memory. For example, the device DEV can exclude a number n of Bluetooth multimedia devices in which it powered the buffer memories last, if it can deduce that other Bluetooth multimedia devices necessarily exist in which the buffer memory is less filled and which will determine the aforementioned maximum duration.

According to another implementation, the device DEV is arranged to store an identifier of the Bluetooth multimedia device, the buffer memory of which it powered longest. When a packet is lost, the device DEV then only verifies the buffer memory of this Bluetooth multimedia device, the buffer memory of which it powered longest. According to a possible implementation, the controlling device is arranged to transmit portions of audio stream of about 14 ms (which corresponds to the duration of an audio stream block encoded by the SBC codec). According to a possible implementation, the controlling device controls four Bluetooth multimedia devices, and the transmission of a portion of about 14 ms takes about 1.3 ms. Thus it takes about 4*1.3 ms or about 5.2 ms to transmit about 14 ms of stream to the four Bluetooth multimedia devices, which leaves about 14 ms-5.2 ms or about 8.8 ms during which the controlling device can identify the packets that were improperly transmitted or not transmitted and retransmit them.

According to a possible implementation, the device for controlling Bluetooth multimedia devices is arranged to configure the "Flush Timeout" of each L2CAP channel depending on the fill state of the buffer memories of the Bluetooth multimedia devices, that it must estimate beforehand for example by one of the aforementioned methods.

According to another possible implementation, it is considered the case where the "Flush Timeout" of a L2CAP channel indicates that an infinite number of retransmissions is allowed (i.e. retransmission is performed until the link is lost). In that case, the device for controlling Bluetooth multimedia device is arranged to request a flush of the packets present in the L2CAP layer which are associated with the L2CAP channel, when the device for controlling Bluetooth multimedia device considers that retransmission is not effective. The request will have the effect to reset all the pending retransmissions for the specific L2CAP channel so that new packets are transmitted. In an example, a retransmission is not considered effective where the size of the queue storing the packets to be retransmitted, is greater than a predetermined size value. In another example, a retransmission is not considered effective where congestion is detected in the queue storing the packets to be retransmitted.

According to one possible implementation, the modification of the A2DP profile consists of modifying the AVDTP layer used by the A2DP profile, for example in one of the ways indicated below. In order to implement an AVDTP layer corresponding to a modified AVDTP layer, it is possible in particular to use an available implementation such as BlueZ (well known to those skilled in the art), designed to implement Bluetooth technology on Linux operating systems and available under the GNU GPL license. The BlueZ implementation has become a reference Bluetooth implementation for Linux and has been integrated into the Linux kernel.

An embodiment relates to a method for controlling Bluetooth multimedia devices by a Bluetooth chip. The Bluetooth chip implements a modified A2DP profile (denoted A2DP') so as to create a point-to-multipoint link from said Bluetooth chip to a plurality of Bluetooth multimedia devices, the Bluetooth chip transmitting a plurality of multimedia streams related to each other, each intended for a respective Bluetooth multimedia device among said plurality of Bluetooth multimedia devices, while relying on a non-blocking usage of Bluetooth.

According to one possible implementation, the Bluetooth chip comprises a processor and executes a computer program adapted to implement an A2DP' profile so as to create a point-to-multipoint link from said Bluetooth chip to a plurality of Bluetooth multimedia devices, the Bluetooth chip transmitting a plurality of multimedia streams related to each other, each intended for a respective Bluetooth multimedia device among said plurality of Bluetooth multimedia devices, while relying on a non-blocking usage of Bluetooth.

According to an alternative implementation, it is a device for controlling Bluetooth multimedia devices comprising said Bluetooth chip which also comprises a processor and executes a computer program adapted to implement an A2DP' profile so as to create a point-to-multipoint link from said Bluetooth chip to a plurality of Bluetooth multimedia devices, the Bluetooth chip transmitting a plurality of multimedia streams related to each other, each intended for a respective Bluetooth multimedia device among said plurality of Bluetooth multimedia devices, while relying on a non-blocking usage of Bluetooth.

In the two aforementioned implementations, the computer program is stored in a memory (for example EEPROM, Flash, or ROM). This memory may be embedded in the Bluetooth chip or in the device for controlling Bluetooth multimedia devices but outside the Bluetooth chip. According to a variant, the computer program is stored partly in the Bluetooth chip and partly in the device for controlling Bluetooth multimedia devices. According to a variant, the device for controlling Bluetooth multimedia devices and the Bluetooth chip each comprise at least one separate processor, and each executes a portion of the computer program which is stored either in a single location (single memory chip) or in a distributed manner in multiple memory chips (for example a memory chip of the Bluetooth chip and a memory chip of the device for controlling Bluetooth multimedia devices).

According to another implementation, the method is implemented not by a computer program but by a dedicated electronic chip, which is for example an FPGA or any other suitable circuit, including an ad hoc circuit. According to a variant, the method is partially implemented by a dedicated electronic chip such as a dedicated chip as mentioned above, and partially by a processor executing a suitable computer program.

An embodiment relates to a computer program comprising a series of instructions which, when executed by a processor, implement a method according to the embodiments. This computer program is written, for example, in a low-level language such as an assembly language, or in a higher level and more portable language such as the C language. According to one possible implementation, the computer program is divided into a plurality of modules. According to one possible implementation, the various modules are all written in the same language, for example the C language or an assembly language. Alternatively, some modules are written in different languages, for example some modules are written in C, others in an assembly language. According to one possible implementation, all the modules are stored in the same memory. Alternatively, some modules are stored in separate memories.

An embodiment relates to a computer-readable non-transitory storage medium storing a computer program according to the ninth embodiment. According to one possible implementation, the storage medium is a USB key, an SD card, or a micro SD card. In a variant, the storage medium is any memory card. In another variant, the storage medium is a memory chip which is intended to be mounted on an electronic circuit. These include, for example, EEPROM, ROM, or Flash memory. According to one possible variant, the storage medium is a magnetic medium (for example hard drive) or optical medium (for example CD or DVD).

The invention is not limited to the embodiments described above by way of example. The usable memories cover any type of memory.

The embodiments described in relation to the device for controlling wireless multimedia devices can be transposed to the methods for controlling wireless multimedia devices, as well as to the computer programs and to the program storage media according to embodiments of the invention, and vice versa.

The invention claimed is:

1. A Bluetooth device to control a plurality of wireless audio devices, the Bluetooth device comprising:
a wireless communication circuit configured to receive a wireless audio device identifier from each of the wireless audio devices, each of the wireless audio devices having characteristics;
a sound processing circuit configured to apply independent audio effects on a main audio stream such that the sound processing circuit outputs a same number of modified audio streams as a number of the wireless audio device identifiers of the wireless audio devices received by the wireless communication circuit, based on the characteristics of each of the wireless audio devices, the sound processing circuit comprising a content extraction circuit configured to extract the modified audio streams from the main audio stream;

an allocation circuit configured to allocate each of the modified audio streams to a respective wireless audio device; and a transmission circuit configured to wirelessly transmit through a Bluetooth usage each of the modified audio streams to said respective wireless audio device for emission by the wireless audio devices.

2. The Bluetooth device according to claim 1, wherein the characteristics of the wireless audio devices comprise a spatial position of each of the wireless audio devices.

3. The Bluetooth device according to claim 1, further comprising an access circuit configured to access a protocol circuit of the wireless communication circuit, the access circuit being configured to obtain the characteristics of each of the wireless audio devices from the protocol circuit of the wireless communication circuit, the modified audio streams being modified by the sound processing circuit based on the characteristics relative to each of the wireless audio devices.

4. The Bluetooth device according to claim 1, further comprising:
a database storing information about a plurality of wireless audio device identifiers of the plurality of wireless audio devices and the characteristics of the wireless audio devices, and
an interrogation circuit configured to retrieve the characteristics of the wireless audio devices associated with the received wireless audio device identifiers from the database.

5. The Bluetooth device according to claim 1, wherein the sound processing circuit comprises a duplication circuit configured to duplicate the main audio stream into a same number of duplicated audio streams as the number of the wireless audio device identifiers of the wireless audio devices received by the wireless communication circuit, the sound processing circuit being configured to apply audio effects respectively on each of the duplicated audio streams based on the characteristics of each of the wireless audio devices to output the modified audio streams.

6. The Bluetooth device according to claim 1, wherein the sound processing circuit comprises a separation circuit configured to separate the main audio stream into a same number of separated audio streams as the number of the wireless audio identifiers of the wireless audio devices received by the wireless communication circuit, the separated audio streams being the modified audio streams.

7. The Bluetooth device according to claim 1, wherein the transmission circuit is configured to transmit each of the modified audio streams to said respective wireless audio device for synchronized emission by the wireless audio devices.

8. The Bluetooth device according to claim 2, further comprising an access circuit configured to access a protocol circuit of the wireless communication circuit, the access circuit being configured to obtain the characteristics of each of the wireless audio devices from the protocol circuit of the wireless communication circuit, the modified audio streams being modified by the sound processing circuit based on the characteristics relative to each of the wireless audio devices.

9. The Bluetooth device according to claim 2, further comprising:
a database storing information about a plurality of wireless audio device identifiers of the plurality of wireless audio devices and the characteristics of the wireless audio devices, and
an interrogation circuit configured to retrieve the characteristics of the wireless audio devices associated with the received wireless audio device identifiers from the database.

10. The Bluetooth device according to claim 3, further comprising:
a database storing information about a plurality of wireless audio device identifiers of the plurality of wireless audio devices and the characteristics of the wireless audio devices, and
an interrogation circuit configured to retrieve the characteristics of the wireless audio devices associated with the received wireless audio device identifiers from the database.

11. The Bluetooth device according to claim 2, wherein the sound processing circuit comprises a duplication circuit configured to duplicate the main audio stream into a same number of duplicated audio streams as the number of the wireless audio device identifiers of the wireless audio devices received by the wireless communication circuit, the sound processing circuit being configured to apply audio effects respectively on each of the duplicated audio streams based on the characteristics of each of the wireless audio devices to output the modified audio streams.

12. The Bluetooth device according to claim 3, wherein the sound processing circuit comprises a duplication circuit configured to duplicate the main audio stream into a same number of duplicated audio streams as the number of the wireless audio device identifiers of the wireless audio devices received by the wireless communication circuit, the sound processing circuit being configured to apply audio effects respectively on each of the duplicated audio streams based on the characteristics of each of the wireless audio devices to output the modified audio streams.

13. The Bluetooth device according to claim 4, wherein the sound processing circuit comprises a duplication circuit configured to duplicate the main audio stream into a same number of duplicated audio streams as the number of the wireless audio device identifiers of the wireless audio devices received by the wireless communication circuit, the sound processing circuit being configured to apply audio effects respectively on each of the duplicated audio streams based on the characteristics of each of the wireless audio devices to output the modified audio streams.

14. A method for controlling a plurality of wireless audio devices with a Bluetooth device, the method comprising:
receiving, at a wireless communication circuit, a wireless audio device identifier from each of the wireless audio devices, each of the wireless audio devices having characteristics;
applying, at a sound processing circuit, independent audio effects on a main audio stream such that the sound processing circuit outputs a same number of modified audio streams a number of the wireless audio device identifiers of the wireless audio devices received by the wireless communication circuit, based on the characteristics of each of the wireless audio devices, the sound processing circuit comprises a content extraction circuit configured to extract the modified audio streams from the main audio stream;
allocating, at an allocation circuit, each of the modified audio streams to a respective wireless audio device; and wirelessly transmitting through a Bluetooth usage, at a transmission circuit, each of the modified audio streams to said respective wireless audio device for synchronized emission by the wireless audio devices.

15. The method according to claim 14, wherein the characteristics of the wireless audio devices comprise a spatial position of each of the wireless audio devices.

16. The method according to claim 14, further comprising obtaining, by an access circuit configured to access a protocol circuit of the wireless communication circuit, the characteristics of each of the wireless audio devices from the protocol circuit of the wireless communication circuit, the modified audio streams being modified by the sound processing circuit based on the characteristics relative to each of the wireless devices.

17. The method according to claim 14, further comprising duplicating, by a duplication circuit, the main audio stream into a same number of duplicated audio streams as the number of the wireless audio device identifiers of the wireless audio devices received by the wireless communication circuit, the sound processing circuit being configured to apply audio effects respectively on each of the duplicated audio streams based on the characteristics of each of the wireless audio devices to output the modified audio streams.

18. The method according to claim 14, further comprising separating, by a separation circuit in the sound processing circuit, the main audio stream into a same number of separated audio streams as the number of the wireless audio identifiers of the wireless audio devices, the separated audio streams being the modified audio streams.

19. A non-transitory computer-readable medium on which is stored a computer program comprising a series of instructions which, when executed by a processor, implement the method according to claim 14.

20. A Bluetooth device to control a plurality of wireless multimedia devices, the Bluetooth device comprising:
a wireless communication circuit configured to receive a wireless multimedia device identifier from each of the wireless multimedia devices, each of the wireless multimedia devices having characteristics;
a sound processing circuit configured to apply independent audio effects on a main multimedia stream such that the sound processing circuit outputs a same number of modified multimedia streams as a number of the wireless multimedia device identifiers of the wireless multimedia devices received by the wireless communication circuit, based on the characteristics of each of the wireless multimedia devices, the sound processing circuit comprising a content extraction circuit configured to extract the modified multimedia streams from the main multimedia stream;
an allocation circuit configured to allocate each of the modified multimedia streams to a respective wireless multimedia device; and
a transmission circuit configured to wirelessly transmit through a Bluetooth usage each of the modified multimedia streams to said respective wireless multimedia device for emission by the wireless multimedia devices.

* * * * *